(12) United States Patent
Valembois et al.

(10) Patent No.: US 6,901,836 B1
(45) Date of Patent: Jun. 7, 2005

(54) CONTROLLED RUPTURE DEVICE FOR A STRUCTURE OPERATING IN TRACTION AND EQUIPMENT USING SAME

(75) Inventors: Guy Valembois, Blagnac (FR); Pascal Gendre, Toulouse (FR); Régis Riffet, Roquettes (FR)

(73) Assignee: Etienne Lacroix Tous Artifices S.A., Muret (FR)

( * ) Notice: Subject to any disclaimer, the term of this patent is extended or adjusted under 35 U.S.C. 154(b) by 0 days.

(21) Appl. No.: 09/913,971

(22) PCT Filed: Feb. 18, 2000

(86) PCT No.: PCT/FR00/00413

§ 371 (c)(1),
(2), (4) Date: Jan. 3, 2002

(87) PCT Pub. No.: WO00/48778

PCT Pub. Date: Aug. 24, 2000

(30) Foreign Application Priority Data

Feb. 19, 1999 (FR) .............................. 99 02087

(51) Int. Cl.⁷ ................................................ B64D 1/04
(52) U.S. Cl. ............................................ 89/1.14; 225/6
(58) Field of Search .............................. 225/6, 2, 96.5; 102/378, 377; 89/1.14

(56) References Cited

U.S. PATENT DOCUMENTS

| | | | | |
|---|---|---|---|---|
| 3,393,605 A | * | 7/1968 | Parnell | 89/1.14 |
| 3,975,981 A | * | 8/1976 | Seifert | 89/1.14 |
| 4,216,004 A | * | 8/1980 | Brehm et al. | 225/2 |
| 4,301,707 A | * | 11/1981 | Schimmel et al. | 89/1.14 |
| 4,315,584 A | * | 2/1982 | Wuestner | 225/2 |
| 4,502,620 A | * | 3/1985 | Leiby | 225/2 |
| 4,607,775 A | * | 8/1986 | Krause | 225/96.5 |
| 5,129,306 A | * | 7/1992 | Fauvel | 89/1.14 |
| 5,361,676 A | * | 11/1994 | Gibbs | 89/1.14 |
| 5,382,276 A | * | 1/1995 | Hakoun et al. | 65/433 |
| 5,585,596 A | * | 12/1996 | Richards et al. | 102/378 |
| 5,839,635 A | * | 11/1998 | Mansfield et al. | 225/96.5 |
| 5,842,622 A | * | 12/1998 | Mansfield et al. | 225/96.5 |
| 6,125,762 A | * | 10/2000 | Fritz et al. | 102/378 |
| 6,250,227 B1 | * | 6/2001 | Salort | 102/378 |

FOREIGN PATENT DOCUMENTS

| | | | |
|---|---|---|---|
| DE | 19604410 A1 | 2/1996 | .......... C03B/37/16 |
| DE | 298 09 585 U1 | 9/1998 | |
| EP | 0 055 165 | 12/1981 | |
| EP | 0596400 A2 | 10/1993 | .......... F52B/15/38 |
| FR | 319823 | 3/1902 | |
| FR | 464778 | 3/1914 | |
| FR | 619738 | 4/1927 | |
| FR | 704466 | 5/1931 | |
| FR | 364746 | 9/1976 | |
| FR | 456585 | 5/1979 | |
| FR | 492336 | 10/1980 | |
| FR | 495991 | 12/1980 | |
| JP | 61232404 | * 10/1986 | |

* cited by examiner

Primary Examiner—Michael J. Carone
Assistant Examiner—Troy Chambers
(74) Attorney, Agent, or Firm—Blakely Sokoloff Taylor & Zafman

(57) ABSTRACT

A device is presented including a first support element, a second support element (110) which is separate from the first support element, a structure placed in tension between the two support elements and a rupture device associated with the structure in tension so as to rupture the structure in tension on demand. The device additionally includes a beam working in compression, inserted between the two support elements in parallel with the structure to be ruptured.

29 Claims, 5 Drawing Sheets

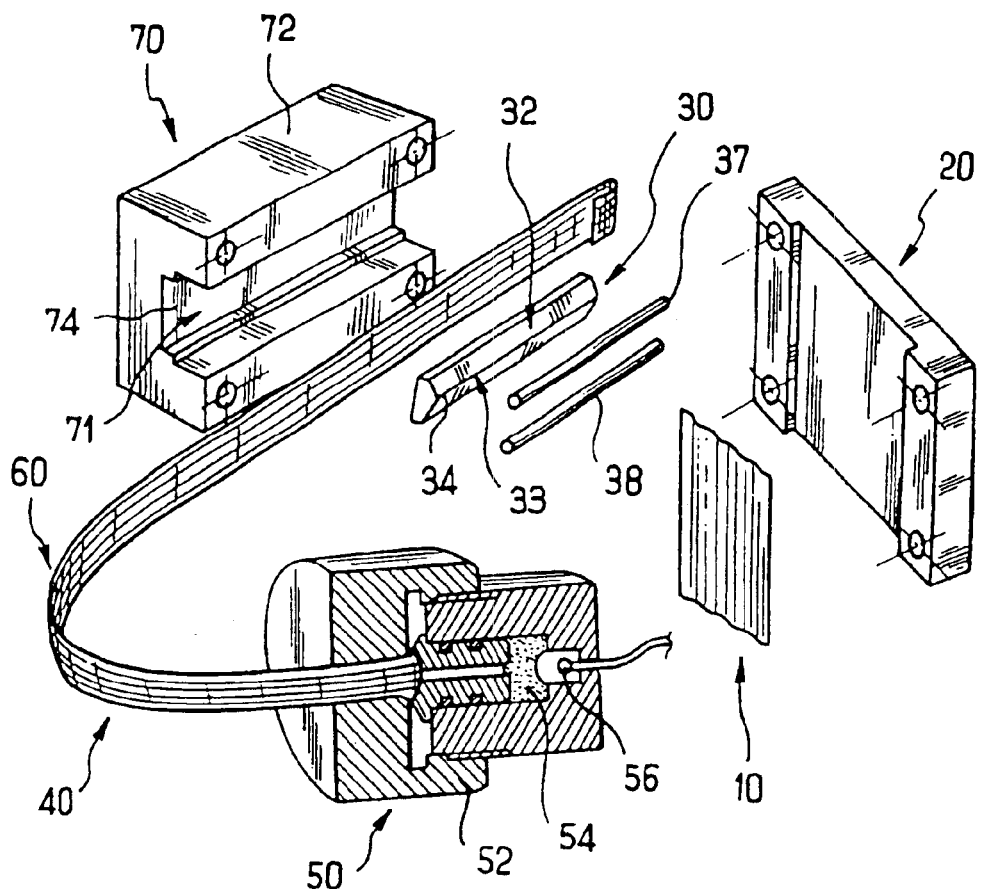
FIG_1
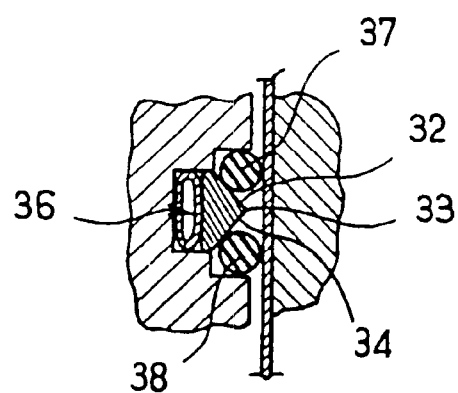
FIG_2

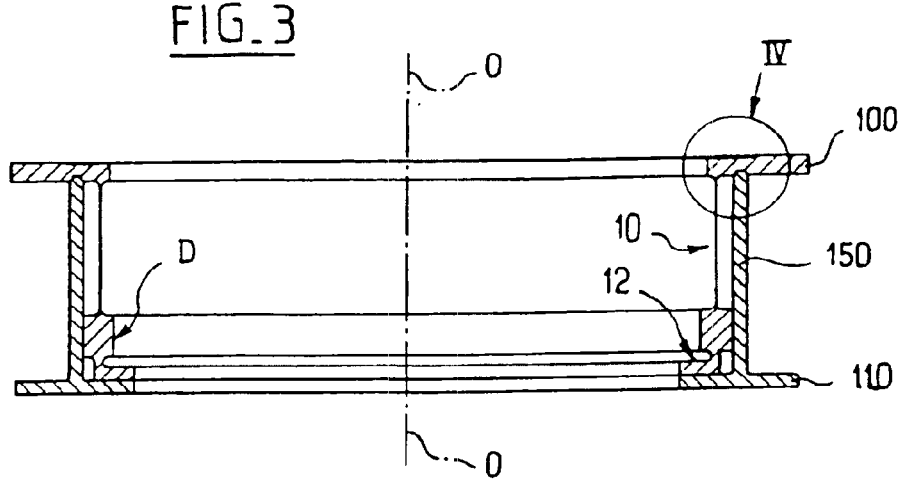
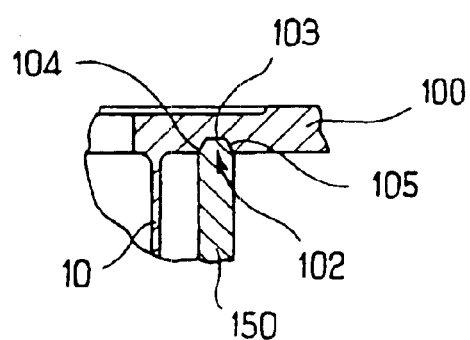
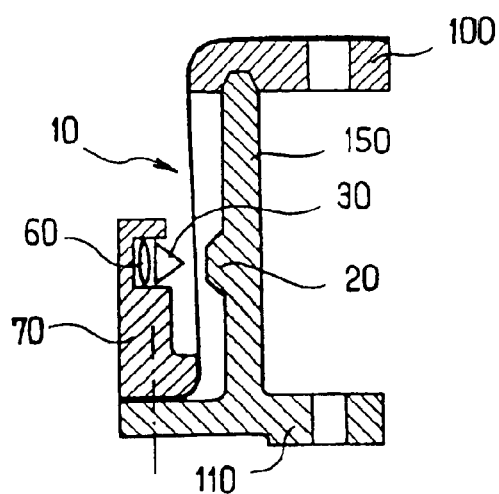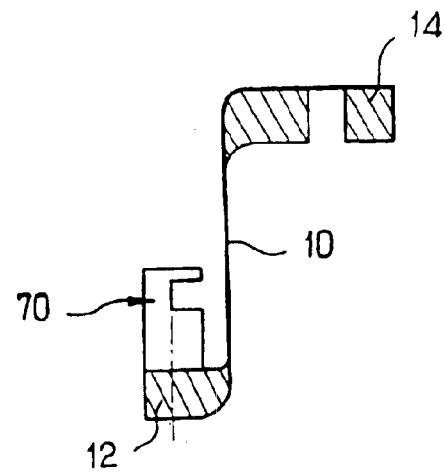

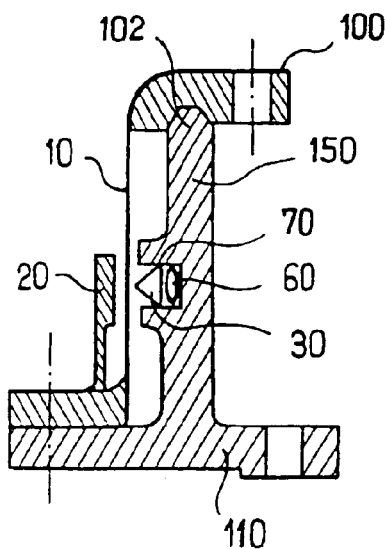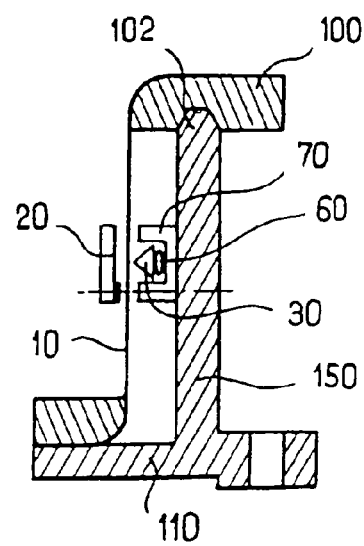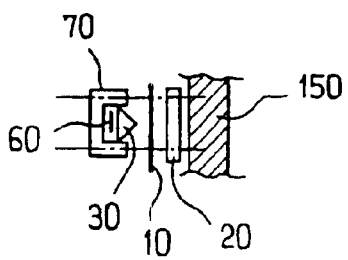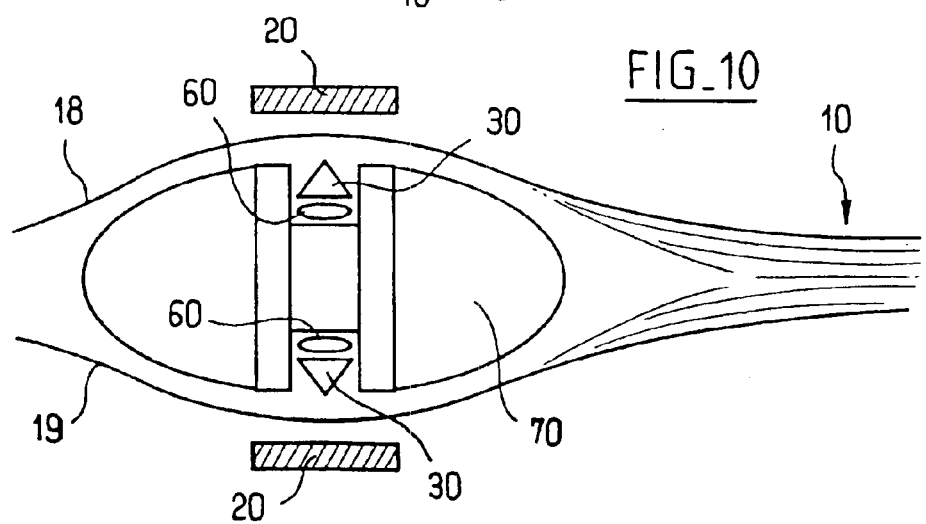

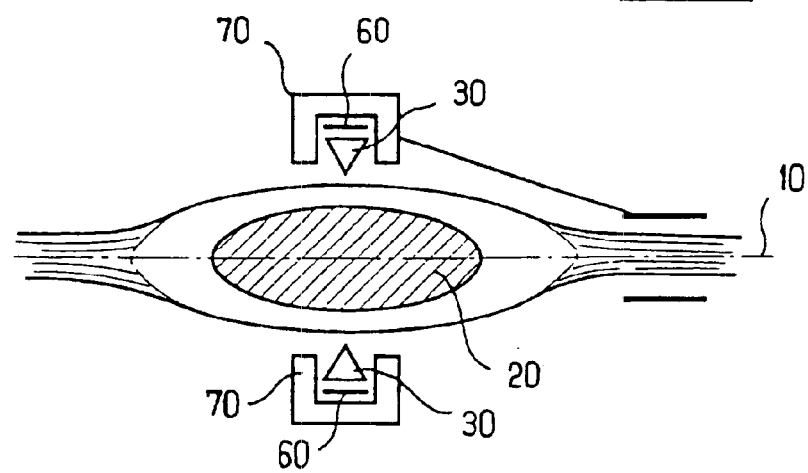
FIG._11
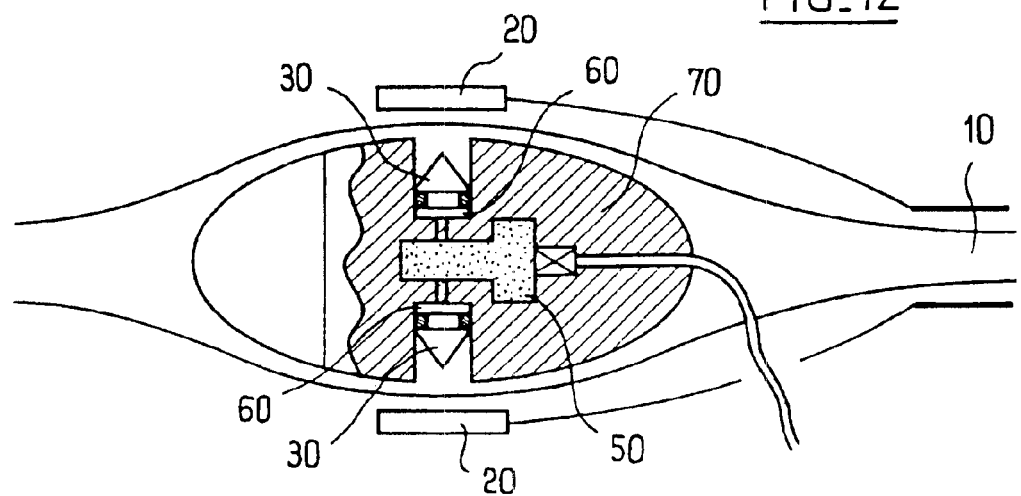
FIG._12
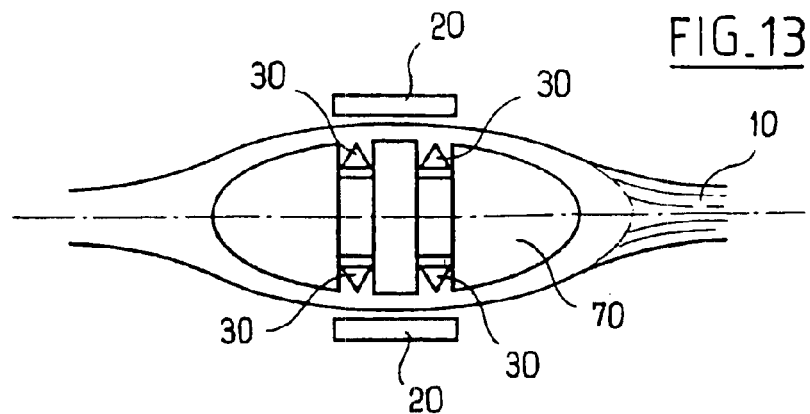
FIG._13

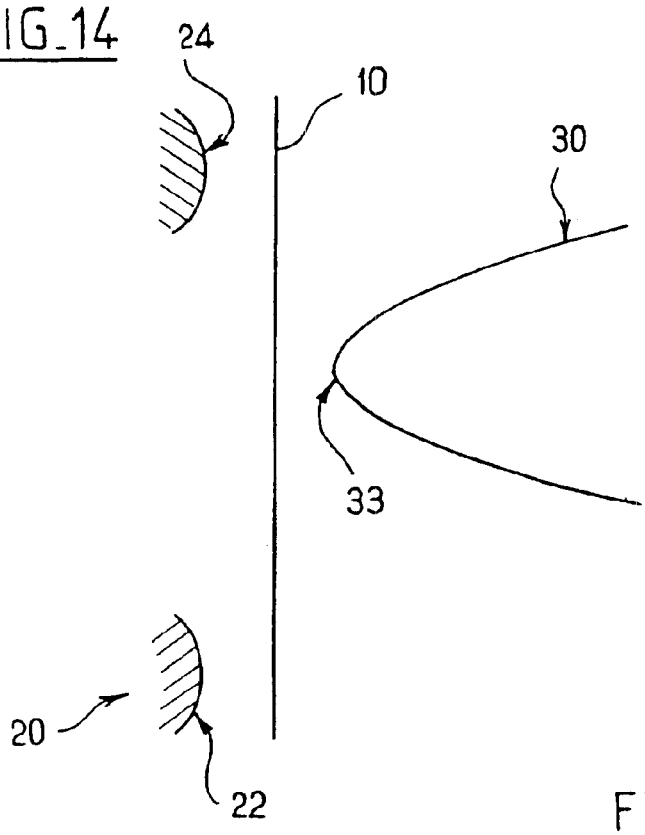
FIG_14
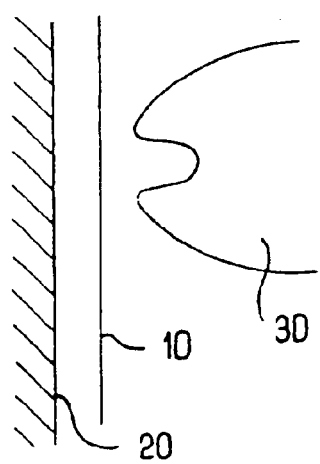
FIG_15
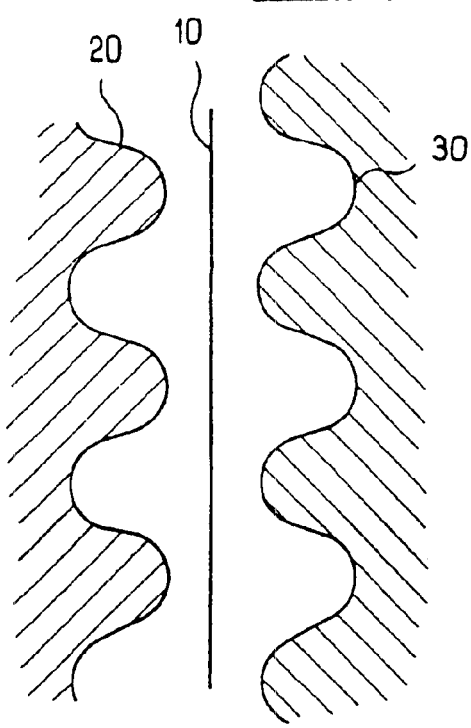
FIG_16

CONTROLLED RUPTURE DEVICE FOR A STRUCTURE OPERATING IN TRACTION AND EQUIPMENT USING SAME

BACKGROUND FIELD

The present invention relates to the field of controlled-rupture devices for structures, particularly structures operating in tension.

DESCRIPTION OF RELATED ART

The present invention may, in particular, find an application in the controlled rupture of ties or supports for holding systems, when these need to be released.

More specifically still, the present invention preferably applies to the field of assemblies comprising systems which are highly sensitive to mechanical stress. Thus, the present invention may in particular find an application in the field of aerospace, for example as a support designed to perform the controlled release of small-sized satellites.

Numerous devices for cutting ties, cables or the like have already been proposed.

In particular, numerous rupture devices based on detonating cords have already been proposed.

On this point, reference may be made, for example, to documents FR-A-2 495 991, FR-A-2 492 336, FR-A-2 364 746, FR-A-2 464 778 and EP-A-55165.

These known devices are still not satisfactory, however. In particular, they generate not insignificant shocks in the structures cut and their environment. Furthermore, they lead to pollution which is unacceptable in certain applications.

Numerous cutting devices comprising a cutter and an element such as a pyrotechnic generator designed to move the cutter against the structure to be ruptured in order to rupture the latter through the penetration of the cutter into the material of the structure and thus reduction in the thickness thereof have also been proposed.

On this point, reference may be made for example to documents FR-A-2 319 823, FR-A-2 456 585, FR-A-2 704 466 and DE-A-29809585.

However, hitherto, the devices of this type have still not been satisfactory either. They also lead to not insignificant shocks and to risks of pollution following the escape of the gases originating from the pyrotechnic generator.

Solutions based on expanding pyrotechnic tubes filled with explosive and placed against the structure to be ruptured, near to a line of weakness formed therein, have also been proposed.

On this point, reference may be made for example to document FR-A-2 619 738.

This solution is not entirely satisfactory either. This is because it actually leads to a shock level which is too high for certain applications.

Document DE-19604410 describes a device comprising a structure placed in tension between two support elements, and a rupture device associated with this structure in tension so as to rupture the latter on demand.

SUMMARY

In an attempt to improve the situation, present-day studies are tending toward the use of a damper coupled to the cutting device in order to limit the level of mechanical stress applied to the equipment that is to be released.

It is an object of the present invention to propose a new device designed to allow the rupture of a structure forming a tie operating in tension and holding a system, which device is designed to limit the mechanical stress applied to the system at the time of the rupture of the tie, particularly to limit the vibration transmitted to the system.

Another auxiliary object of the present invention is to propose a rupture device of a structure avoiding any pollution of the environment.

These objects are achieved in the context of the present invention by virtue of a device as defined in the appended claim 1.

As a preference, this device for the controlled rupture of fibers, particularly pretensioned fibers, is characterized in that it comprises two stressing members arranged one on each side of the fibers, and operating means designed to, on demand, bring about a relative displacement toward each other of the stressing members, the latter being shaped so that, as they move closer together, they impose on the fibers a radius of curvature that is below the threshold of curvature thereof that leads to rupture in bending.

The applicant company has determined that this device, which works by bending the fibers rather than by penetrating the material and stationary, while the other can move under the actuation of the operating means.

According to an advantageous feature of the present invention, the operating means comprise a pyrotechnic charge capable of generating a high-pressure gas and an inflatable sealed member connected to the pyrotechnic charge and in contact with at least one of the stressing members so as to bring about a displacement of this when said charge is initiated.

According to another advantageous feature of the present invention, the structure to be ruptured, formed on the basis of fibers, may at least in part be agglomerated with a synthetic material so as to form a composite material. As a preference, the structure to be ruptured consists of a strap or the like.

The present invention also relates to an equipment item employing such a rupture device. As indicated above, such an equipment item may, for example, be configured to act as a temporary support for microsatellites on board a rocket, so as to release these at a determined and controlled point on the rocket trajectory.

According to the present invention, an equipment item such as this comprises a structure placed in tension between two support elements, a rupture device free of mechanical shock associated with this structure in tension so as to rupture the latter on demand, and a beam working in compression, inserted between these two support elements in parallel with the structure to be ruptured. In such an equipment item, the beam makes it possible to maintain the relative position of the support elements, in combination with the structure in tension. Further, all that is required is for this structure in tension to be ruptured in order to eliminate the link there is between the two support elements and thus release at least one of these together with the systems, such as satellites, linked to it.

An equipment item such as this may in particular find an application in the support of (a) microsatellite(s) on a launcher. However, it is not restricted to this particular application.

BRIEF DESCRIPTION OF THE DRAWINGS

Other features, objects and advantages of the present invention will become apparent upon reading the detailed description which will follow and from studying the appended drawings, given by way of non-limiting examples, and in which:

FIG. 1 depicts a diagrammatic view in exploded perspective of the basic means that make up a rupture device according to the present invention, FIG. 2 depicts a view in cross section of the same means, FIG. 3 depicts a view in section of controlled-rupture support equipment comprising a means that can withstand compression, FIG. 4 depicts a detail view of such an equipment item, for the region referenced IV in FIG. 3, and FIGS. 5 to 16 illustrate alternative forms of embodiment of the rupture device according to the present invention.

DETAILED DESCRIPTION

The appended FIGS. 1 and 2 show the basic structure of a device according to the present invention, designed for the controlled rupture of a structure formed of a tape 10.

This tape 10 may itself be embodied in numerous ways.

In the context of the present invention, the structure 10 to be ruptured is preferably formed on the basis of fibers, such as carbon fibers, glass fibers, aramid fibers for example, or alternatively any other type of fiber, used in particular in the textile field and capable of withstanding high tensile forces compatible with the intended applications.

If appropriate, these fibers may be agglomerated in a synthetic material, for example rigidly polymerized, to form a structure to be ruptured 10 made of composite material.

Furthermore, as appropriate, in the context of the present invention, the structure to be ruptured 10 may be nonhomogeneous over its entire length. In particular, it is possible to envisage a structure 10 to be ruptured formed of composite material, that is to say based on fibers embedded in a synthetic material, except in its rupture zone placed facing the stressing means where it consists exclusively of fibers or essentially of fibers and of a small amount of synthetic material.

In the context of the present invention, the fibers are oriented essentially longitudinally, that is to say parallel to the direction of the tension exerted on the structure to be ruptured. This may be a unidirectional fiber structure. However, in an alternative form, fibers oriented transversely may be envisaged.

The structures to be ruptured may be formed of a woven or of a nonwoven.

As a preference, in the context of the present invention, the structures 10 to be ruptured have a longitudinal elastic modulus in excess of 20 000 MPa.

Furthermore, according to a nonlimiting feature of the invention, the fibers used preferably have an individual diameter of between 0.1 and 25 $\mu$m, or even between 0.1 and 10 $\mu$m.

According to the preferred embodiment of the invention, the aforementioned stressing members are formed of retaining means 20, such as an anvil, and of a punch 30.

Further, these stressing means are associated with means 40 designed to bring about a relative displacement, on demand, between the retaining means 20 and the punch 30. The means 40 are preferably of pyrotechnic type.

As mentioned earlier, the stressing members such as the punch 30 and the retaining means 20 are arranged one on each side of the fibers 10.

As also mentioned earlier, the stressing members, such as the punch 30 and the retaining means 20, are shaped so that, as they move closer together, they impose on the fibers 10 a radius of curvature that is below the threshold of curvature thereof that leads to rupture in bending.

The punch 30 is preferably formed of a hard material, for example high-carbon steel such as 100C6, with a modulus oe higher than 2 000 MPa. The punch may be configured in many ways.

As a preference, it essentially comprises, on one side, a dihedron formed of two flat faces 32, 34 which meet at a somewhat rounded edge 33 directed toward the structure 10 to be ruptured and, on the other side, a flat face 36 perpendicular to the plane of symmetry of the dihedron and designed to be stressed by the means 40. The edge 33 extends at right angles to the longitudinal direction of the fibers. The flat face 36 extends parallel to the longitudinal direction thereof.

In the context of the present invention, the dihedron formed by the faces 32, 34 preferably defines an angle of between 30 and 90°, very preferably of the order of 60°.

The radius of curvature of the rounded edge 33 is preferably smaller than the minimum radius that the fibers 10 can tolerate before they rupture in bending.

In the context of the present invention, the means 40 for bringing about the displacement of the punch 30 are advantageously formed by the combination of a high-pressure gas pyrotechnic generator 50 and of an inflatable sealed element 60.

The pyrotechnic generator 50 is placed in a rigid casing 52, preferably remote from the punch 30. The rigid casing 52 may itself be formed by assembling several components.

The separation between the pyrotechnic generator casing 52 and the punch 30 is intended to mechanically decouple the pyrotechnic generator 50 and the punch 30 so as to avoid the transmission of detrimental mechanical stresses, particularly vibration, between the casing 52 and the punch 30.

By way of nonlimiting example, it is possible to envisage a separation of the order of 100 mm, minimum, between the pyrotechnic generator 50 and the punch 30.

The structure of the pyrotechnic generator 50 is known per se. The casing 52 defines an internal chamber 54 accommodating a powder charge in conjunction with an initiator 56.

The initiator 56 is preferably of electrical type. However, as appropriate, it is possible to envisage a percussive initiator because of the mechanical decoupling defined between the casing 52 and the punch 30.

It is important that, in the context of the present invention, the powder 54 be designed to generate a gas by combustion and not at all by a deflagration or detonation effect.

The inflatable sealed element 60 is preferably formed of an elongate tube, packaged at rest in the flattened state. Thus, at rest, the flat two main faces of the flattened tube 60 run parallel to the rear attack face 36 of the punch 30 as can be seen in FIG. 2. One of the flat main faces of the flattened tube 60 incidentally rests on this flat attack face 36. The other face of the tube 60 rests on a stationary bearing face 71.

More specifically still, in the context of the present invention, the inflatable sealed element 60 is preferably formed of a stainless steel tube.

The sealed connection between the tube 60 and the pyrotechnic gas generator 50 may be achieved by any appropriate means, for example by crimping.

The opposite end of the tube may be plugged by any appropriate means.

By way of nonlimiting example, the inflatable sealed tube 60 may have a diameter of the order of 4 mm and a wall thickness of the order of 0.2 to 0.3 mm.

Those skilled in the art will readily understand that, when the generator 50 develops a pressurized gas inside the tube 60, the tube changes from its flattened rest state to an inflated state of approximately circular cross section.

Thus, the deformation of the inflatable tube 60 bearing against the surface 71 causes the punch 30 to move against the structure to be ruptured 10, so that the latter is sandwiched between the two stressing members such as the punch 30 and the anvil 20.

As already stated, in the context of the present invention, the punch 30 is preferably designed to rupture the element to be ruptured 10, not at all by penetrating the material of which this structure to be ruptured 10 is made and therefore by gradually reducing the thickness thereof, but by local deformation of the fibers of which the structure to be ruptured is made, in bending beyond their ability to deform.

To do that, the anvil 20 is preferably formed of a material not as hard as the punch 30, so as to tolerate at least a slight penetration of the structure to be ruptured 10 and possibly of the punch 30, under the effect of the stress thereon, so as to bring about the aforementioned bending.

By way of nonlimiting example, the anvil 20 may be formed of a medium-carbon steel. However, many other materials may be envisaged, including, for example, materials based on elastomer or materials exhibiting plastic behavior, such as aluminum, copper, lead, etc.

By way of nonlimiting example, the anvil 20 may be made of a material having an ultimate tensile strength $\sigma e$ of below 600 MPa.

As appropriate, the anvil 20 may also have, facing the edge 33 of the punch 30, a groove or hollow making it easier to bend the tape, when the latter rests on the margins of said groove or hollow, while the intermediate segment of the structure to be ruptured 10 enters said groove or hollow under the effect of the punch.

If appropriate, the retaining means 20 may incidentally be formed simply of two supports 22, 24 situated on the opposite side of the fibers 10 to the punch 30, as can be seen in FIG. 14, the two supports 22, 24 being arranged one on each side of the edge 33 of the punch 30 in the longitudinal direction of the fibers 10.

According to another advantageous feature of the present invention, the distance separating the two supports 22, 24 is between one times the diameter or thickness of the fibers 10 and the amplitude of relative displacement of the stressing means 20, 30, preferably between two times the diameter or thickness of the fibers 10 and the amplitude of relative displacement of the stressing means 20, 30.

FIG. 15 illustrates an alternative form of embodiment whereby the stressing members comprise a recessed punch 30, placed facing an anvil 20 which is not as hard, for example based on elastomer.

FIG. 16 illustrates another alternative form of embodiment whereby the two stressing members are formed of comb-shaped members placed facing each other and offset from one another by half a pitch in the longitudinal direction of the fibers.

When the fibers 10 are stressed in bending by the stressing members 20 and 30, the part of the fibers that lies on the inside of the curvature experiences compressive stress. Conversely, the part of the fibers situated on the outside of the curvature experiences a tensile stress $\sigma 1$ due to bending, to which is possibly added a tensile force $\sigma 2$ applied to the fibers independently of any bending.

The maximum permissible stress that the fibers 10 can withstand before they rupture can be determined by the relationship:

$$\sigma = [(d/2)E]/r$$

terming:

$\sigma$ represents the maximum local tensile or compressive stress ($\sigma = \sigma 1 + \sigma 2$), E the longitudinal elastic modulus, r the mean radius of curvature, and d the diameter or thickness of the beam consisting of a fiber 10.

The applicant company has moreover determined that the above formula led to the following radii of curvature r upon rupture for a fiber having a diameter d of 10 μm:

|  | E (in GPa) | σ (in MPa) | r (in mm) |
| --- | --- | --- | --- |
| High-modulus carbon | 3 600 | 2 400 | 0.75 |
| High-strength carbon | 260 | 3 200 | 0.4 |
| R-glass | 85 | 3 200 | 0.13 |
| E-glass | 74 | 2 450 | 0.15 |
| Kevlar 49 | 132 | 3 000 | 0.22 |
| Kevlar 29 | 82 | 3 000 | 0.13 |
| Steel (35 NCD 16) | 220 | 1 600 | 0.68 |

Thus, the applicant company determined that the maximum radius of the edge 33 of the punch 30 is preferably of the order of 1 mm, preferably at maximum of the order of 0.75 mm.

As a preference, in the context of the present invention, means designed to initially keep the punch 30 away from the structure 10 to be ruptured as long as the generator 50 is not initiated are also preferably provided.

Such temporary keeping means may be formed of numerous appropriate structures.

In the context of the present invention, such temporary keeping means may be formed of two strips of elastic material, for example of silicone elastomer 37, 38, arranged respectively between the structure to be ruptured 10 and one of the flanks 32, 34 of the punch.

By way of nonlimiting example, these may be two silicone elastomer strips with a diameter of the order of 2.5 mm.

In the context of the present invention, such temporary keeping means may be designed, for example, to keep the edge 33 of the punch 30 a distance of the order of 0.5 mm away from the structure to be ruptured 10.

In order to rupture the structure 10, the tube 60 has to receive about 2.5 cm$^3$ of gas at 500 bar.

Thus, the generator 50 is preferably designed to produce at least 1.25 l of gas at one atmosphere.

The applicant company obtained very satisfactory results during tests on the severing of an omni-directional carbon-fiber strap of the order of 25 mm wide and of the order of 0.3 mm thick. These tests, performed with a rupture device of the type illustrated in the aforementioned FIGS. 1 and 2, actually led to a level of shocks on the structure to be ruptured 10 and on its environment of less than 40 g.

The device further comprises means 70 designed to keep the inflatable tape 60 in position and to guide the punch 30 between a retracted position away from the structure to be ruptured 10, as illustrated in FIG. 2, and a working position in which the edge 33 of the punch 30 stresses the structure to be ruptured 10 to bring about local bending thereof and cause it to rupture.

These means 70 supporting the tape 60 and guiding the punch 30 may be embodied in numerous alternative ways.

According to the embodiment illustrated in FIGS. 1 and 2, such support means have thus been represented in the form of a block 72 having a stepped groove.

The structure of an equipment item employing such a rupture device will now be described with reference to the appended FIGS. 3 and 4. As indicated earlier, such an equipment item may, for example, be configured to act as a temporary support or interface for micro-satellites on board a rocket or a launcher, so as to release these at a determined and controlled release point.

According to the present invention, such an equipment item comprises a structure 10 placed in tension between two support elements 100, 110, a rupture device 20, 30, 40, 50 free of mechanical shock associated with this structure in tension 10 so as to rupture the latter on demand, and a beam 150 working in compression, inserted between these two support elements 100, 110 in parallel with the structure to be ruptured 10. In such an equipment item, the beam 150 makes it possible to maintain the relative position of the support elements 100, 110, in combination with the structure in tension 10. Further, all that is required is for this structure in tension 10 to be ruptured in order to eliminate the link there is between the two support elements 100, 110, and thus to release at least one of these, together with the systems, such as satellites, linked to it.

The structure illustrated in the appended FIGS. 3 and 4 is an annular structure centered about an axis O—O.

This structure comprises two mutually parallel washers 100, 110 taking the place of the aforementioned support elements, the mean plane of which is perpendicular to the axis O—O and which are centered on this axis.

The lower washer 10 can rest, for example, on a base, such as the chassis of a satellite launcher, while the upper washer 100 itself acts as a support bracket for these satellites, or for any other equivalent equipment that is to be released with precision at a controlled moment.

The two washers 100, 110 are joined together by a structure 10 working in tension. Furthermore, an element or beam 150 working in compression is inserted between these washers 100 and 110, in parallel with the structure in tension 10.

The structure to be ruptured 10 is associated with a shock-free rupture device schematically depicted in FIG. 3 and identified by the general reference D, according to the present invention, comprising stressing members 20, 30 arranged one on each side of the structure 10, for example in the form of a punch 30 associated with a pyrotechnic generator 50 and with an inflatable sealed member 60 as indicated earlier.

As indicated earlier, in this context, all that is required is for the structure 10 to be ruptured by implementing the stressing members 20, 30 in order to disconnect the washers 100, 110 and thus release the elements, such as microsatellites, carried by the washer 100.

In the context of this application, the structure to be ruptured 10 may be formed of a continuous annulus centered about the axis O—O (in which case, a set of punch segments 30 covering almost the entirety of the interior surface of this structure to be ruptured 10 is provided) or of several elements distributed about the axis O—O (in which case a punch 30 covering the width of each structure to be ruptured 10, facing a respective one of these structures, is provided).

It will be noted that the element 10 to be ruptured working in tension and the element 150 working in compression preferably run parallel to the central axis O—O.

The structure to be ruptured 10 is secured, by one of its axis ends, to one of the washers, for example the washer 100, and is secured at its other end to a flange 12 designed to be fixed by any appropriate means, for example by screwing, to the other washer, such as 110.

For its part, the element working in compression is formed of a wall or beam built into at least one of the washers 100, 110, such as the washer 100, so as to be able to be separated therefrom when the structure to be ruptured 10 is ruptured. According to the particular embodiment illustrated in FIGS. 3 and 4, the element working in compression 150 is formed of an aluminum cylinder, the inner and outer faces of which are delimited by mutually parallel generators parallel to the axis O—O. The wall 150 is formed integrally with the lower washer 110 and built into the upper washer 100.

The geometry whereby the wall 150 working in compression is built into the upper washer 100 may be embodied in numerous alternative ways.

According to the nonlimiting embodiment given in the appended figures, the washer 100 has an annular groove 102 defined by a base surface 103 in the form of a ring perpendicular to the axis O—O and centered on the latter, defining the bottom of a groove, and two flanks 104, 105 diverging from one another in the direction away from the base surface 103, and toward the outer surface of the washer 100. The two flanks 104, 105 are preferably symmetric with respect to a generator parallel to the axis O—O and are inclined with respect to this generator by an angle of between 10 and 60°.

The end of the wall 150 working in compression has a geometry that complements this groove 102.

Of course, as an alternative, it is possible to provide a partition 150 working in compression and connected by any appropriate means to the base washer 110.

By way of nonlimiting example, the wall 150 working in compression may be made of aluminum, with a thickness of the order of 5 mm and a height (distance separating the two washers 100, 110) of the order of 80 mm, the inside diameter of the washers 100, 110 being of the order of 230 mm.

FIG. 5 illustrates an alternative form of embodiment whereby the element 70 forming a guide for the inflatable tube 60 and the punch 30 is fixed to the washer 110, while the anvil 20 consists of the element 150 taking the place of the element resistant to compression. More specifically still, the anvil 20 is formed at an additional thickness of this element 150.

Like the embodiment of FIGS. 3 and 4, the element 150 resistant to compression is arranged radially on the outside of the element 10.

One of the ends of the structure 10 to be ruptured is sandwiched between the part 70 acting as a guide and the washer 110. The other end of the structure to be ruptured 10 is fixed by any appropriate means to the second washer 100.

FIG. 6 illustrates an alternative form of embodiment whereby the structure 10 to be ruptured is formed of a composite piece, equipped with additional thicknesses at each of its ends to form flanges 12, 14 intended for attachment to the washers 110, 100 or any equivalent means.

More specifically still, according to the embodiment illustrated in FIG. 6, the composite piece comprises, on the ends of the element to be ruptured 10 which typically is formed of a cylindrical skirt, respective flanges 12, 14 which on the whole are perpendicular to the axis of the cylindrical element 10 and face respectively, in the case of the flange 12, inward and, in the case of the flange 14, outward.

The alternative form thus described with reference to FIG. 6 is made up of a cylindrical element 10 and of two annular flanges 12, 14. According to another alternative form, it is possible to envisage an element to be ruptured 10 formed of a straight tape equipped, at each of its ends, formed integrally, with additional thicknesses 12, 14 similar to the means illustrated in FIG. 6.

The piece 70 acting as a guide for the inflatable tube 60 and for the punch 30 can be formed integrally on the flange 12 or attached and secured to the latter by any appropriate means.

FIG. 7 illustrates another alternative form whereby the compression element 150 acts as a guide for the punch 30 and for the inflatable tube 60. In this case, there is an anvil 20 on the opposite side of the element 10 to be ruptured to the punch 30. This anvil 20 is fixed, by any appropriate means, to one of the flanges or washers 100, 110.

More specifically still, according to the embodiment illustrated in FIG. 7, the element 150 resistant to compression is equipped within its mass with a groove which guides the inflatable tube 60 and the punch 30.

By contrast, according to the alternative form illustrated in FIG. 8, the inflatable tube 60 and the punch 30 are placed in a guide 70 attached to the element 150 resistant to compression. Furthermore, here again, according to FIG. 8, there is an anvil 20 on the opposite side of the element to be ruptured 10 to the punch 30. It is furthermore possible to envisage for the anvil 20 to itself be secured to the guide 70.

Yet another alternative form, illustrated in FIG. 9, consists in placing the anvil 20, formed of an attached part, on the element 150 resistant to compression, and the guide 70 on the opposite side of the element to be ruptured 10 to the anvil.

In the various embodiments described above, with reference to FIG. 3 et seq., the element to be ruptured 10 runs in an overall direction parallel to the axis O—O of the annular structure. Further, the punch 30 is mounted to move in a direction generally transversal to this axis O—O.

Furthermore, it was indicated earlier that the element to be ruptured 10 could be formed either of a continuous annular structure centered about the axis O—O, or of discrete elements distributed about this axis O—O.

In this context, the element to be ruptured 10 may be formed, for example, of a tape. This may be unitary, that is to say formed of a single strand, for example of elongate rectilinear cross section, or alternatively circular or oblong, or may be split into various strands.

According to another alternative form, the element to be ruptured 10 may be formed of a tubular tape or equivalent, that is to say one having a loop-shaped cross section, for example in the form of a closed curve. In this case, it may, for example, be a flattened circular knit.

In the latter cases, it is possible to envisage placing at least one of the anvil elements or punch 30 in the space between the various strands making up the element to be ruptured or even in the interior space of the cross section of a tubular tape.

FIG. 10 thus illustrates a support structure in the shape of an ogee 70 placed between two strands 18, 19 of an element 10 to be ruptured, and acting as a guide for the portions of inflatable tube 60 and for the punch segments 30 which are placed facing complementary anvils 20 so that the strands 18, 19 are sandwiched between said anvils 20 and the punch segments 30.

When such an ogee shape 70 is placed inside the cross section of a tape 10 which has a cross section in the form of a closed curve, it is of course necessary for the ogee shape 70 to support a number of portions of inflatable tube 60 and of punch 30 which together cover the entire periphery of the element to be ruptured 10.

According to the embodiment illustrated in FIG. 10, the various portions of inflatable tube 60 and punch segments 30 are located overall in a common plane orthogonal to the axis of the tape 10. As an alternative, however, particularly when the punch segments 30 have to cover the entire periphery of the ogee shape 70, it is possible to envisage staging these longitudinally along the ogee shape 70 to ensure an overlap between the ends of the various punch segments 30 and thus guarantee complete rupture of the tape 10.

FIG. 11 illustrates a reverse arrangement, that is to say an anvil 20 formed of an ogee shape located at the center of the tape to be ruptured and structures 70 providing guidance of the inflatable tube 60 and of associated punch segments 30 arranged facing it, on the outside of the element to be ruptured 10.

In the context of FIG. 10, it is possible to envisage arranging the pressurized gas pyrotechnic generator on the outside of the ogee shape 70 and of the structure to be ruptured 10. However, as has been illustrated in FIG. 12, as an alternative, it is possible to envisage incorporating the pyrotechnic generator 50 into the ogee shape 70. In this case, use may be made of a pyrotechnic generator 50 common to the various punch segments 30 or alternatively of a pyrotechnic generator 50 associated with each respective punch 30.

FIG. 13 illustrates another alternative form of embodiment whereby there are two punches 30 each associated with a respective pyrotechnic generator (not depicted in FIG. 13 in order to simplify the illustration) facing each of the zones to be severed of the element 10. Of course, a correspondingly designed facing anvil 20 is provided.

This arrangement illustrated in FIG. 13 allows a redundant effect and a guarantee of rupture of the structure in the event of deficiency of one of the pyrotechnic generators 50 or alternatively of the associated sealed inflatable tube 60 or even of the displacement of the punch 30.

The use of such a double structure of punch 30 can be applied to all the alternative forms of the present invention which have already been described.

What is claimed is:

1. A device comprising a first support element (100), a second support element (110) which is separate from said first support element (100), a structure (10) comprising pretensioned fibers able of rupture when bent with a radius of curvature which is smaller than a predetermined threshold, said pretensioned fibers being placed in tension between said two support elements (100, 110), a beam (150) inserted between said two support elements (100, 110) in parallel with the structure so as to work in compression between said two support elements (100, 110), and a rupture device (20, 30, 40, 50) comprising two stressing members (20, 30) and operating means (40), said two stressing members (20, 30) being arranged one on each side of the fibers (10), said stressing members being able to relative displacement toward each other, one or said stressing members having an edge directed towards the fibers, said edge having a radius of curvature which is smaller than the minimum radius that the fibers can tolerate before they rupture in bending, and said operating means (40) being designed to bring about the relative displacement of said stressing members (20, 30) so as to bend and to rupture said structure in tension when said pretensioned fibers are bent with a radius of curvature which is smaller than said predetermined threshold.

2. The device as claimed in claim 1, characterized in that the stressing members comprise a punch (30) and retaining means (20) arranged one on each side of the fibers (10).

3. The device as claimed in claim 1, characterized in that the operating means (40) are of pyrotechnic type.

4. The device as claimed in claim 1, characterized in that the operating means (40) comprise a pyrotechnic charge (50) capable of generating a high-pressure gas and an inflatable sealed member (60) connected to the pyrotechnic charge (50) and in contact with at least one of the stressing members (20, 30) so as to bring about a relative displacement of these when said charge (50) is initiated.

5. The device as claimed in claim 1, characterized in that the structure to be ruptured (10) is made at least in part of composite material.

6. The device as claimed in claim 1, characterized in that the structure to be ruptured (10) consists of a strap.

7. The device as claimed in claim 1, characterized in that the structure to be ruptured (10) is nonhomogeneous over its entire length and consists essentially of fibers at the rupture zone placed facing the stressing members (30) and consists of a composite material, fibers embedded in a synthetic material, outside this rupture zone.

8. The device as claimed in claims 1, characterized in that the fibers that make up the structure to be ruptured (10) have a longitudinal elastic modulus in excess of 20 000 MPa.

9. The device as claimed in claim 1, characterized in that the fibers that make up the structure to be ruptured (10) have a diameter of 0.1 to 25 µm.

10. The device as claimed in claim 1, characterized in that one of the stressing members comprises a punch (30) made of high-carbon steel.

11. The device as claimed in claim 1, characterized in that one of the stressing members comprises a punch (30) which defines a dihedron, the angle of which is between 30 and 90°.

12. The device as claimed in claim 2, characterized in that the punch (30) has an edge (33), the maximum radius of curvature r of which is defined by the relationship $$r=[(d/2)E]/\sigma$$

in which

σ represents the maximum local extensile or compressive stress,

E represents the longitudinal elastic modulus, and d represents the diameter or thickness of the beam consisting of a fiber (10).

13. The device as claimed in claim 2, characterized in that the punch (30) has an edge (33), the radius of curvature r of which is at maximum of 1 mm.

14. The device as claimed in claim 1, characterized in that the operating means (40) comprise a pyrotechnic generator (50) which has an electric initiator (56).

15. The device as claimed in claim 1, characterized in that the operating means (40) comprises a pyrotechnic generator (50) which has a charge (54) capable of generating a gas by combustion.

16. The device as claimed in claim 4, characterized in that the inflatable sealed member (60) is formed of a stainless steel tube.

17. The device as claimed in claim 4, characterized in that the inflatable sealed member (60) has a diameter of 4 mm.

18. The device as claimed in claim 1, characterized in that the stressing means comprise a punch and retaining means (20) formed of an anvil and located one on each side of the structure to be ruptured (10).

19. The device as claimed in claim 18, characterized in that the anvil (20) is made of medium-carbon steel.

20. The device as claimed in claim 4, characterized in that a pyrotechnic generator (50) is designed to emit at least 1.5 l of gas at one atmosphere.

21. The device as claimed in claim 1, characterized in that said structure (10) has an annular structure.

22. The device as claimed in claim 21, characterized in that the structure to be ruptured (10) is formed of a continuous annulus.

23. The device as claimed in claim 21, characterized in that the structure to be ruptured (10) is formed of several elements distributed about the axis O—O of the structure.

24. The device as claimed in claim 1, characterized in that the beam (150) working in compression is formed integrally with one of the two support elements (100, 110).

25. The device as claimed in claim 2, characterized in that the beam (150) working in compression also serves as retaining means (20).

26. The device as claimed in claim 2, characterized in that the beam (150) working in compression also serves as a guide for the punch (30) and, as appropriate, for an inflatable tube (60) belonging to the operating means.

27. The device as claimed in claim 1, characterized in that the fibers that make up the structure to be ruptured (10) have a diameter of 0.1 to 10 µm.

28. The as claimed in claim 1, characterized in that one of the stressing members comprises a punch (30) which defines a dihedron, the angle of which is about 60°.

29. The device as claimed in claim 2, characterized in that the punch (30) has an edge (33), the radius of curvature of which is at maximum of 0.75 mm.

* * * * *